United States Patent
Pierre et al.

(10) Patent No.: US 8,032,913 B1
(45) Date of Patent: Oct. 4, 2011

(54) EVENT BOOKING MECHANISM

(75) Inventors: Ludovic Pierre, Sunnyvale, CA (US); Thierry Godin, Paris (FR); Rama Kalluri, San Jose, CA (US); Jino Nguyen, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 1488 days.

(21) Appl. No.: 09/657,250

(22) Filed: Sep. 6, 2000

(30) Foreign Application Priority Data

Nov. 9, 1999 (FR) .......................... PCT/IB99/01903

(51) Int. Cl.
*H04N 7/173* (2011.01)

(52) U.S. Cl. ............ 725/93; 725/53; 725/116; 719/318; 709/219

(58) Field of Classification Search .................. 725/146, 725/86–103, 50–53, 114–117; 719/318; 709/217–231
See application file for complete search history.

(56) References Cited

U.S. PATENT DOCUMENTS

| | | | | |
|---|---|---|---|---|
| 5,063,523 A | * | 11/1991 | Vrenjak | 709/223 |
| 5,699,107 A | * | 12/1997 | Lawler et al. | 725/58 |
| 5,754,858 A | * | 5/1998 | Broman et al. | 717/111 |
| 5,812,768 A | * | 9/1998 | Page et al. | 709/228 |
| 5,918,020 A | * | 6/1999 | Blackard et al. | 709/228 |
| 5,958,010 A | * | 9/1999 | Agarwal et al. | 709/224 |
| 6,085,169 A | * | 7/2000 | Walker et al. | 705/26 |

(Continued)

FOREIGN PATENT DOCUMENTS

WO 98/11724 3/1998

(Continued)

OTHER PUBLICATIONS

Rosner, "Robust, flexible, middleware helps organizations integrate their enterprise information systems: Enterprise Integration," SYBASE, Jun. 1999, pp. 22-27.

(Continued)

*Primary Examiner* — Annan Q Shang
(74) *Attorney, Agent, or Firm* — Rory D. Rankin; Meyertons, Hood, Kivlin, Kowert & Goetzel, P.C.

(57) ABSTRACT

A mechanism for booking events comprising an event broker, one or more event managers and one or more action handlers. In one embodiment, the event broker is configured to register a plurality of event bookings, each of which identifies an event and a corresponding action. For each event booking, the event broker notifies an event manager which is configured to detect the type of event identified in the event booking. When the event manager detects the identified event, it notifies the event broker. The broker then notifies an action handler which is configured to initiate the type of action identified in the event booking. The action handler then initiates the action. If the event booking is non-recurring and the action is complete, the event booking is unregistered by the event broker. The event broker is configured to work in conjunction with a plurality of event managers which can detect different types of events and a plurality of action handlers which can initiate different types of actions. The event broker is configured to resolve resource conflicts between actions for which the corresponding events have been detected. The event broker is further configured to control access to event bookings through a security system which can use privileges or credentials to identify clients which are authorized to read, modify, delete or otherwise access information contained in the event bookings.

27 Claims, 6 Drawing Sheets

U.S. PATENT DOCUMENTS

| | | | | |
|---|---|---|---|---|
| 6,094,688 | A * | 7/2000 | Mellen-Garnett et al. | 719/328 |
| 6,108,695 | A * | 8/2000 | Chawla | 709/217 |
| 6,175,871 | B1 * | 1/2001 | Schuster et al. | 709/231 |
| 6,275,471 | B1 * | 8/2001 | Bushmitch et al. | 370/248 |
| 6,374,406 | B2 * | 4/2002 | Hirata | 725/132 |
| 6,446,136 | B1 * | 9/2002 | Pohlmann et al. | 719/318 |
| 6,453,294 | B1 * | 9/2002 | Dutta et al. | 704/270.1 |
| 6,477,585 | B1 * | 11/2002 | Cohen et al. | 719/318 |
| 6,598,169 | B1 * | 7/2003 | Warwick et al. | 713/320 |
| 6,611,654 | B1 * | 8/2003 | Shteyn | 725/86 |
| 6,611,877 | B2 * | 8/2003 | Korn et al. | 719/318 |
| 6,636,901 | B2 * | 10/2003 | Sudhakaran et al. | 719/327 |
| 6,782,541 | B1 * | 8/2004 | Cohen et al. | 719/318 |
| 6,829,770 | B1 * | 12/2004 | Hinson et al. | 719/318 |
| 6,970,935 | B1 * | 11/2005 | Maes | 709/230 |
| 7,260,265 | B2 * | 8/2007 | Prakash et al. | 382/239 |
| 7,478,166 | B2 * | 1/2009 | Agnoli et al. | 709/231 |
| 7,613,631 | B2 * | 11/2009 | Walker et al. | 705/16 |
| 2002/0019886 | A1 * | 2/2002 | Sanghvi et al. | 709/318 |
| 2003/0159150 | A1 * | 8/2003 | Chernock et al. | 725/58 |

FOREIGN PATENT DOCUMENTS

WO  98/43427  10/1998

OTHER PUBLICATIONS

Sybase® Enterprise Event Broker, "Event Enabling the Enterprise Database," © 1999 Sybase, Inc., 4 pgs.

Sybase® Enterprise Event Broker, © 1999 Sybase, Inc., 4 pgs.

International Search Report, Application No. PCT/IB 99/01903, mailed Jun. 6, 2000.

* cited by examiner

EVENT BOOKING MECHANISM

BACKGROUND OF THE INVENTION

1. Field of the Invention

The invention relates generally to broadcast television systems and more particularly to a system and method for booking events and initiating actions in response to detecting these events in a broadcast television receiver.

2. Description of Related Art

It is useful in computer systems to be able to detect particular events and to initiate particular actions in response to these events. For example, in desktop computer systems, it may be desirable to display an email icon when an email message is received. The computer system may also be configured to launch a specific application at a particular time. Similar mechanisms may also be found in videocassette recorders (VCRs,) which are typically configured to be able to schedule the recording of a particular channel when an internal clock reaches a predetermined time. A VCR may also be configured to begin recording a channel when it receives specific information (e.g., information indicating the start of a particular television program) transmitted in the analog vertical blanking interval (VBI) of a broadcast signal. In television systems proposed by the Advanced Television Enhancement Forum (ATVEF,) a trigger in a television broadcast signal can cause the television receiver to display a particular HTML page.

The systems described above, however, have limitations which prevent them from being extended to a generalized event booking mechanism in a broadcast television receiver. For example, in the case of email notifiers and calendar services on desktop computer systems, the events which can be detected and the actions which can be initiated in response thereto are specifically defined for particular applications (e.g., an email application displays an icon in response to receiving a new email message.) The applications provide internal mechanisms which cannot be used by other applications. If a different application requires an additional type of event to be detected or an additional type of action to be initiated, that application must typically provide its own mechanism for detecting that type in event and initiating the respective action. Because this type of mechanism has statically defined events and actions, and requires additional application code (as well as additional memory to store the code,) it is not suitable for the limited resources of a broadcast television receiver. Mechanisms which use triggers (such as VBI or ATVEF triggers) that are delivered in a broadcast signal suffer from these same limitations. These triggers detect statically defined events and initiate statically defined actions. Further, if the action includes launching an application, the application must be present. That is, it cannot be downloaded upon detection of the event and then launched. Consequently, these mechanisms are not suitable for a generalized event booking system in a broadcast television receiver.

SUMMARY OF THE INVENTION

One or more of the problems outlined above may be solved by the various embodiments of the invention. These embodiments may include methods, frameworks and devices for booking events relating to a broadcast television system and initiating actions in response to the occurrence of the booked events.

One embodiment comprises a method in which a client books an event by registering a description of the event and a description of the action that is to be taken upon the occurrence of the event. The agent (or "event manager") that will be employed to detect the event, as well as the action handler that will initiate the action can also be specified. The information describing the event and action (the "event booking") are stored by an event broker. The information is passed to the appropriate event managers and action handlers by the event broker. Upon detection of the event, the event manager notifies the event broker of its occurrence. The event broker, in turn, notifies the action handler. The action handler then initiates the action. When the action is completed, the event broker unregisters the event booking (e.g., removes the event booking from its list of booked events.)

One embodiment comprises a computer readable storage medium which embodies the foregoing method. The storage medium may comprise floppy disks, magnetic tapes, optical disks, RAM, ROM, flash memory, etc. The storage media has program instructions recorded therein for controlling the operation of a processor. The program instructions are executable by the processor to implement the method described above.

In one embodiment, the event booking mechanism comprises a software framework in an interactive television receiver. The framework is implemented in a library which is an extension to the receiver's operating system core. The library includes an event broker, and one or more event managers and action handlers. The event broker is configured to register and track event entries, each of which describes an event and a corresponding action. The event broker is configured to notify the appropriate event manager when an event is booked and to notify the appropriate action handler when an event occurs. The event broker provides centralized management of the event managers, each of which is configured to detect different types of events, and the action handlers, each of which is configured to initiate different types of actions. The modularity provided by this framework allows it to be easily updated with new event managers and action handlers.

In one embodiment, the event booking mechanism is implemented in a receiver of a broadcast television system. One or more clients (e.g., applications which are executing in the receiver) require certain actions to be taken upon the occurrence of corresponding events. The actions may comprise launching applications, opening pop-up dialog boxes, providing data to running applications, or other actions. The events may comprise the start of television programs, the receipt of downloaded modules, the receipt of particular signals or data, reaching predetermined times, or other events. The receiver is configured to allow the clients to book the events and corresponding actions using an event broker which is executing on a processor within the receiver. The event broker registers the events and actions, storing them in a memory in the receiver. For each event, the event broker notifies an event manager to monitor the receiver environment for the event. When the event is detected, the event manager notifies the event broker, which in turn notifies an action handler which initiates the corresponding action.

BRIEF DESCRIPTION OF THE DRAWINGS

Other objects and advantages of the invention will become apparent upon reading the following detailed description and upon reference to the accompanying drawings in which.

Figure 1:
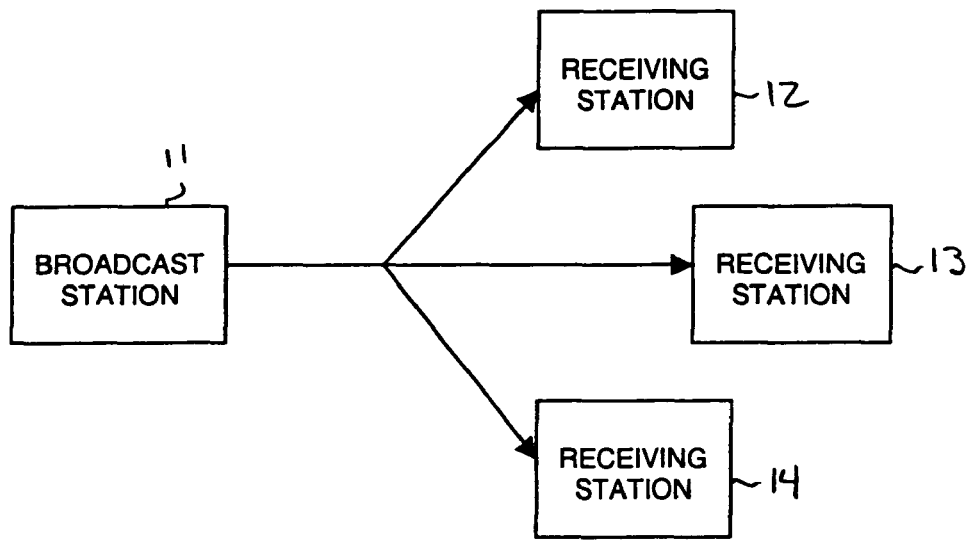
FIG. 1 is a block diagram illustrating the distribution of an interactive television signal from a broadcast station to a plurality of receiving stations in one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. This embodiment comprises a mechanism implemented in a receiver for an interactive television system. The mechanism allows client applications to specify an event and a corresponding action so that, when the event occurs, the action is initiated. The mechanism generally comprises an event broker, one or more event managers and one or more action handlers. The event is booked (or registered) through the event broker. (References herein to a "booked event" may include the corresponding action, and possibly other associated information which is recorded by the event broker when the event is booked.) The event broker notifies one of the event managers that the event has been booked, after which that event manager monitors the data and activities of the receiver for the booked event. When the booked event is detected, the event manager notifies the event broker, which in turn notifies one of the action handlers. That action handler then initiates the action corresponding to the detected event.

While the event broker is intended to provide centralized control and storage of information on the booked events, the event managers are each intended to detect particular types of events. For example, one event manager may be configured to detect the receipt of an email, while another may be configured to detect a program module in the broadcast signal. The types of events detected by each event manager is arbitrarily determined, and an event manager may be configured to detect a single type of event, or several types of events. Likewise, each action handler is intended to initiate particular types of actions, such as launching applications or opening pop-up windows. Because the event booking mechanism supports multiple event managers and action handlers, it can be implemented in a modular fashion which allows third parties to develop their own event managers and action handlers which can be integrated into the mechanism. (It should be noted that, although the disclosed event booking mechanism can employ modular event managers and action handlers, it can also use event managers and action handlers which are contained in existing applications. For example, a client application can register an event booking which uses an email application's event manager to detect incoming emails.)

Therefore, for each type of event which may need to be detected, there will be a corresponding event manager. For each type of action which needs to be initiated, there will be a corresponding action handler. Each event manager will interact with the event broker to monitor and detect events of the types corresponding to that particular event manager. Likewise, each action handler can initiate actions of the types corresponding to that particular action handler. Thus, the event booking mechanism provides centralized management of event bookings, but is flexible enough to accommodate many different types of the events and corresponding actions. This provides a versatile, yet compact event booking mechanism that is suitable for systems, such as interactive television systems, which have limited resources.

As indicated above, one embodiment is implemented in an interactive television system. Referring to FIG. 1, a block diagram illustrating the distribution of an interactive television signal from a broadcast station 11 to a plurality of receiving stations 12-14 is shown. The interactive television signal is distributed over transmission medium 15 to each of the receiving stations. The transmission medium may comprise any suitable broadcast medium, including satellite, cable, telco, MMDS (microwave) or terrestrial transmission systems. Whichever transmission medium is employed, it is assumed that the broadcast station and receiving stations are configured with appropriate transmitters and receivers.

Figure 2:
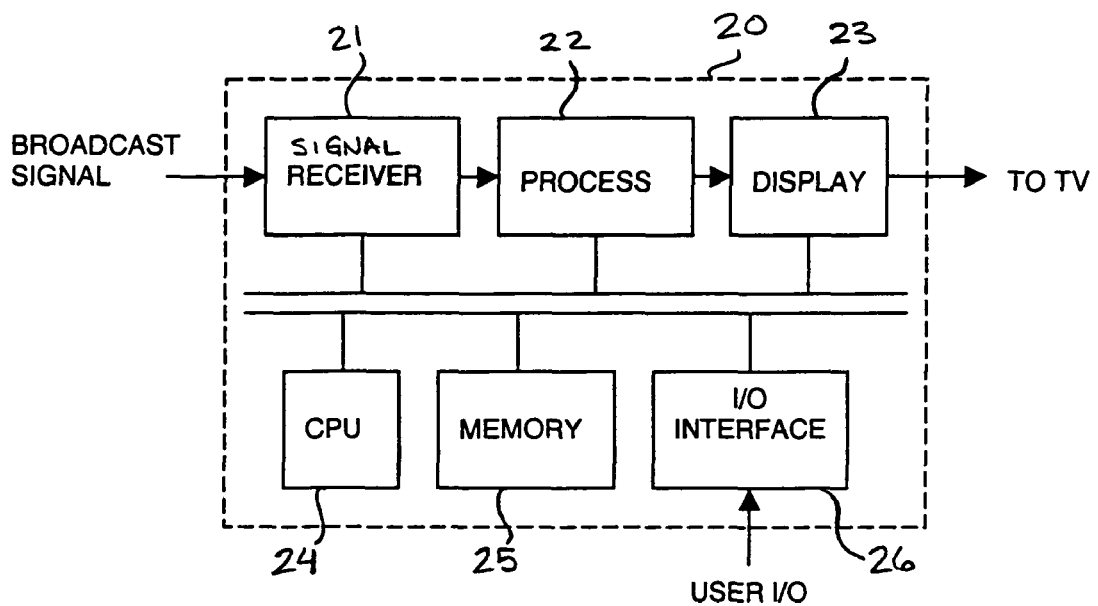
FIG. 2 is a functional block diagram of a receiver which is used in an interactive television system in one embodiment.

Referring to FIG. 2, a receiver 20 which may be employed in the receiving stations is shown. In this embodiment, receiver 20 is implemented in a set-top box for a television. In other embodiments, the receiver may be incorporated into the circuitry of other components of the receiving station, such as the television which is coupled to the receiver. The interactive television signal which is broadcast to the receiving station is received by signal receiver 21. Television programming which is included in the broadcast signal may be processed by processing circuitry 22 and formatted for display by display circuitry 23. The formatted signal may then be transmitted to a television, where it can be displayed to the user.

The interactive television signal may contain information in addition to the television programming. For example, interactive application modules or control signals may be embedded in the broadcast signal. This additional information may be separated out of the signal by one of the components of receiver 20, such as processing unit 22 or even signal receiver 21. The additional information, which may be considered the interactive content of the signal, is typically provided to processor 24 and/or memory 25. Interactive content comprising applications may be executed by processor 24. Other interactive content may be interpreted by processor 24, which may then generate interactive audio or video to be output to the user's television. The user can interact with the applications or other interactive content through I/O devices coupled to I/O interface 26. (It should be noted that the foregoing description of the functionality of the interactive television system is only an example of such a system, and is not intended to be limiting.)

The broadcast signal which is input to receiver 20 forms part of the environment of the receiver. The receiver's environment also includes signals from applications executing in the receiver, user I/O input to the receiver, external (e.g., modem) signals, clock signals, calendar signals and other signals and conditions internal to (and otherwise available to) the receiver. The event booking mechanism monitors the signals and conditions of the receiver's environment to detect events and then triggers associated actions.

Figure 3:
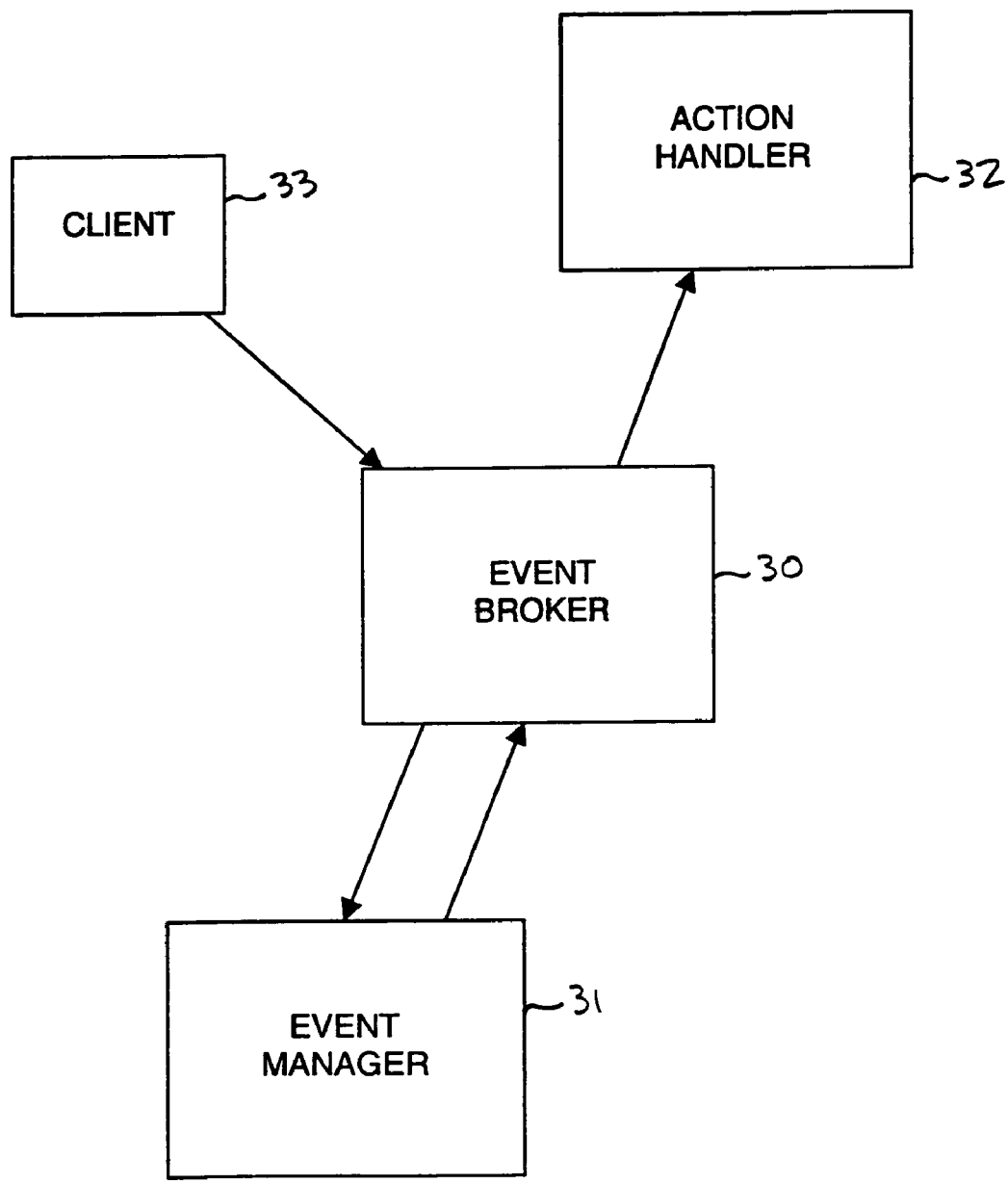
FIG. 3 is a block diagram illustrating the interaction between the event broker, an event manager and an action handler in one embodiment.

The event booking mechanism executes on the receiver's processor. The event booking mechanism allows a client to specify an event and an action which needs to be triggered when the event occurs. Referring to FIG. 3, the interaction between these components with respect to a single event booking is illustrated. In FIG. 3, the functions of the event booking mechanism are divided between the event broker 30, a particular event manager 31 and a particular action handler 32. The event broker receives an event booking from a client 33. The event broker registers the event and corresponding action, then notifies the event manager that it should monitor the receiver environment for the specified event. When the event occurs, the event manager notifies the event broker. The event broker, in turn, notifies the action handler that the event has been detected. The action handler then initiates the action originally specified by the client.

The event broker is responsible for registering, or booking, the events. The event broker does so by storing information relating to each of the booked events in a central location. This central location is not necessarily a single memory device, and may comprise a list or some other type of data structure in which the event bookings are consolidated. (It is noted that the event bookings are preferably stored in a non-volatile memory so that they will not be lost when the receiver is rebooted.) The event broker may control access to the booked events, including queries, modification or termination of the booked events.

The information stored by the event broker defines the event to be detected and the action to be taken in response to detection of the event. (Multiple actions may be associated with a single event, but, in this particular embodiment, the actions must be performed sequentially after the event is detected.) In one embodiment, the event is defined by the name of the event manager which will be used to detect the event and a string describing the event. This string is a character string which identifies the event using the syntax of the event manager. The string may be unintelligible to the event broker. It is not necessary for the event broker to understand the event, however, since it simply needs to notify the event manager that the event has been booked, and to pass on the string. Similarly, the action is defined in this embodiment by the name of the action handler and a string which identifies the event using the syntax of the action handler. The string need not be understandable to the event broker.

In some embodiments, the information stored when the event is booked may include other information. For example, it may include a list of resources used by the action so that the event broker can manage the resources of the receiver; a character string which comprises a user-readable description of the event and/or action; a time limit or expiration date for the event; or privileges associated with the event that define applications or clients which are allowed to access, modify or terminate the booked event. (Other embodiments may include different information that might also be useful in managing the event bookings.) It should be noted that privileges can be assigned in a predetermined manner (e.g., granted to particular clients or groups of clients,) or they can be determined using other mechanisms (e.g., credentials which are carried by clients and which are presented to the event broker when access to booked events is desired.)

The event broker is responsible for resolving resource conflicts when two or more actions which require the same resources can be triggered. In other words, if two actions require the same resource, only one of the actions can be initiated, so the event broker must determine which action will be initiated and which will be delayed. As a result of the need for the event broker to resolve these conflicts, the event broker is also configured in one embodiment to determine the rank of booked events. Once the higher-ranked action is completed, the next-highest-ranked action can be triggered. The event broker may be configured to impute ranks to the booked events. In one embodiment, the ranks imputed by the event broker are based on the order in which the events are booked. The ranks may also be explicitly set by a control application which has appropriate privileges. The control application can open a ranking session, set the ranks of the booked events, and then call the event broker to validate and store the new ranks.

Each event manager is configured to detect one or more particular types of events. The event manager monitors the various signals and conditions of the receiver's environment to determine when an event occurs. The event may be a single signal or condition, or it may be a set of such signals and conditions. The event may be defined by the information stored by the event broker when the event was booked. A plurality of event managers may simultaneously monitor the receiver environment to detect their corresponding events. It should also be noted that multiple actions may be associated with a single event. In one embodiment, a single event manager would detect the described event, while one or more action handlers performed the associated actions. In this embodiment, the actions would be performed sequentially, but in other embodiments, they may be performed simultaneously. Similarly, a plurality of event bookings could associate a number of events with a single action.

Each action handler is configured to initiate one or more particular types of actions. In some cases, the type of action may be relatively broadly defined. For example, the action may consist of launching an application. Obviously, this action might be desirable in a wide range of circumstances, as it may be desired to detect many different events, each of which is intended trigger the launching of an associated application. While a number of actions may be triggered to run concurrently, it is the responsibility of the event broker in this embodiment to determine whether there are any resource conflicts between the actions and to resolve those conflicts (by triggering the highest ranked action and allowing it to complete before triggering a conflicting action.)

As explained above, the event booking mechanism is not restricted to handling only certain types of events or actions. Many different types of events and actions can be accommodated. This is achieved through the use of single event broker which can operate in conjunction with a plurality of event managers and a plurality of action handlers. Each of the event managers is configured to detect a particular type of event. When an event is booked, the event manager which is configured to detect that particular type of event is notified. Likewise, when the event is detected, the action handler which is configured to initiate the particular type of action corresponding to the detected event is notified. If necessary, the event broker can call a different event manager and a different action handler for each of several events which is booked. Conversely, several events may use the same event manager or the same action handler. (It should therefore be noted that the event managers and action handlers may be unique in that they may be configured to handle distinct types or sets of events or actions, but this is not intended to imply that each event manager or action handler can only be used or instantiated only once.)

It should be noted that the foregoing description is intended to be illustrative. In other embodiments, some of the functions described above in relation to particular components in the event booking mechanism may be redistributed. For example, when an event is detected, and event manager may be configured to directly notify the associated action handler rather than notifying the event broker and then having the event broker notify the action handler. Such variations are intended to be within the scope of this disclosure.

Figure 4:
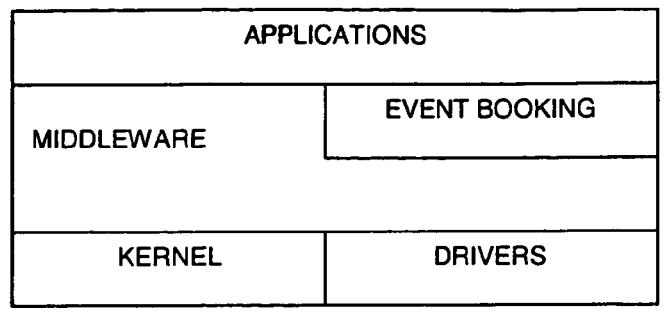
FIG. 4 is a diagram illustrating the layers of software executing in a receiver in one embodiment.

Referring to FIG. 4, the layers of software executing in the receiver are illustrated. The receiver software consists of several layers of software. The kernel and driver layers interface directly with the hardware. The next layer is referred herein to as "middleware." The middleware layer relies on the kernel and drivers and itself consists of a set of libraries that can be recompiled for each hardware platform. The application layer consists of applications that use the services made available by the libraries of the middleware. In the embodiment depicted in FIG. 4, the event booking mechanism is a part of the middleware. The application layer therefore interfaces with the event booking mechanism along with the other middleware libraries.

Because the applications relies on the services provided by the middleware, the applications' life cycles are to some extent controlled by the middleware. For example, applications are sometimes written in a hardware-independent format which must be executed using an interpreter or in the middleware. Similarly, the event bookings are to some extent dependent upon the event booking libraries. If the available event managers or action handlers are updated, or if the system is rebooted and they are removed, event bookings which rely on unavailable event managers or action handlers may have to be removed from the bookings list. Alternatively, compatible event managers or action handlers may be substituted for the unavailable ones.

As indicated above, the event booking mechanism in one embodiment is implemented as a middleware library. This library is an extension of the operating system core. It is contemplated that the library may initially only need to include a limited set of event managers and action handlers. For example, a calendar manager and one or two more event managers may initially be sufficient. Similarly, action handlers which pop-up dialog boxes and launch applications may be sufficient in a basic implementation. Additional event managers and action handlers can be added as needed. New event managers and action handlers can be written when necessary to accommodate new event types and action types. The additional event managers and action handlers can be added to the library without having to modify the entire event booking mechanism. It should be noted that, although the event booking mechanism is implemented in a library in this particular embodiment, it is contemplated that the mechanism could be implemented at the application level in other embodiments.

Figure 5:
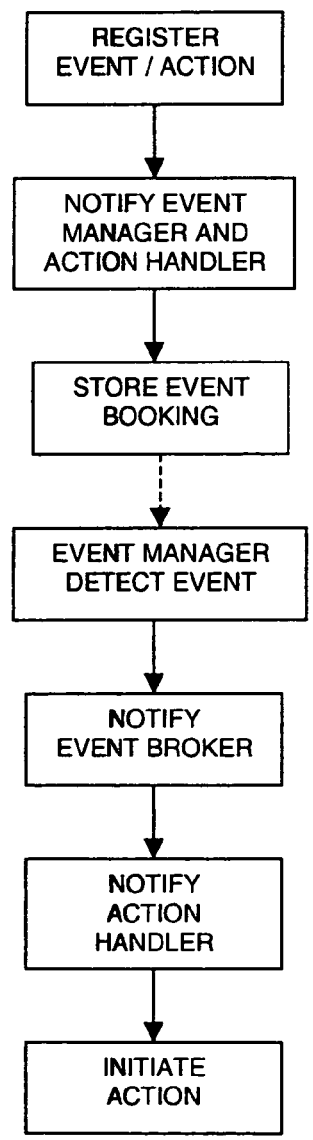
FIG. 5 is a high level flow diagram of the basic method implemented by the event booking mechanism in one embodiment.

Referring to FIG. 5, a high level flow diagram of the basic method implemented by the event booking mechanism is shown. A client application books an event with the event broker, specifying an event and a corresponding action. The event broker notifies the appropriate event manager and action handler of the event and corresponding action and then stores the booked event. (It should be noted that the event manager and action handler are notified of the event and action in this embodiment to confirm that the event should be booked—this confirmation may not be performed in other embodiments.) The event manager then monitors the receiver's environment for the event. (The dashed arrow indicates that there may be a number of intervening occurrences before the event is detected.) When the event is detected, the event manager notifies the event broker. When the event broker is notified by the event manager that the event has been detected, the event broker notifies the action handler that the action corresponding to the event should be performed.

Referring to FIGS. 6-9, the operation of the event booking mechanism in one embodiment is shown in more detail. It should be noted that the event broker (EB,) event manager (EM) and action handler (AH) are indicated by their respective abbreviations in the figures. It should also be noted that communication from one of these components to another is indicated by an arrow from the sender to the receiver.

Figure 6:
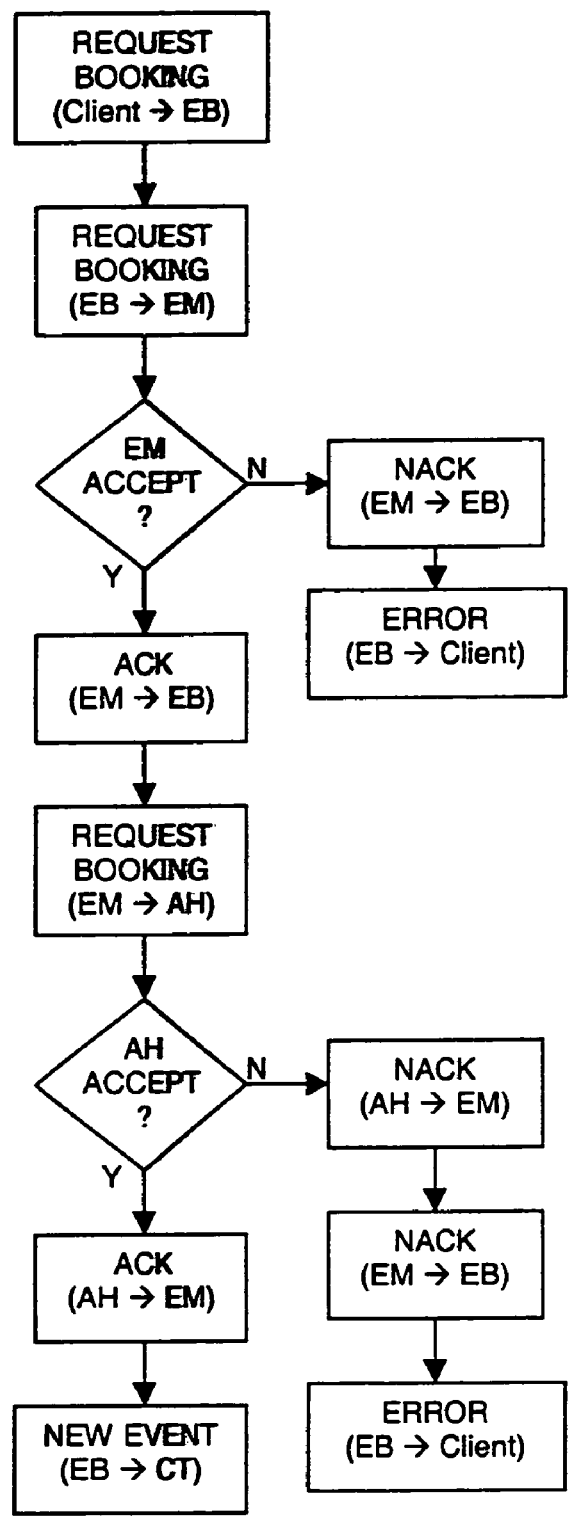
FIG. 6 is a flow diagram illustrating the booking of an event in one embodiment.

The booking of an event in one embodiment is illustrated in the flow diagram of FIG. 6. The client application first transmits to the event broker information necessary to book the event. The event broker determines which event manager should be notified and transmits to that event manager a request to book the event. If the event manager can book the event, an acknowledgement is transmitted to the event broker. If the event manager cannot book the event, a non-acknowledgement is transmitted to the event broker, which then transmits an error notification to the client. If the event manager accepts the booking request, it transmits a similar request to the action handler identified in the request. If the action handler does not accept the request, a non-acknowledgement is transmitted to the event manager and then to the event broker, which in turn transmits an error notification to the client. If the request is accepted by the action handler, an acknowledgement is transmitted to the event manager. The event broker then notifies the control task that a new event has been booked.

In the foregoing description, the event broker transmits requests (or notifications) to the event manager and the action handler before notifying the control task that a new event has been booked. The event broker does so in order to obtain confirmation from the event manager and action handler that the event and the action are adequately described. This is necessary in this embodiment because, as explained above, the event and action are defined using syntax which is understandable to the event manager and the action handler, respectively. The event broker therefore may not be able to verify the event booking information without the help of the event manager and action handler.

Figure 7:
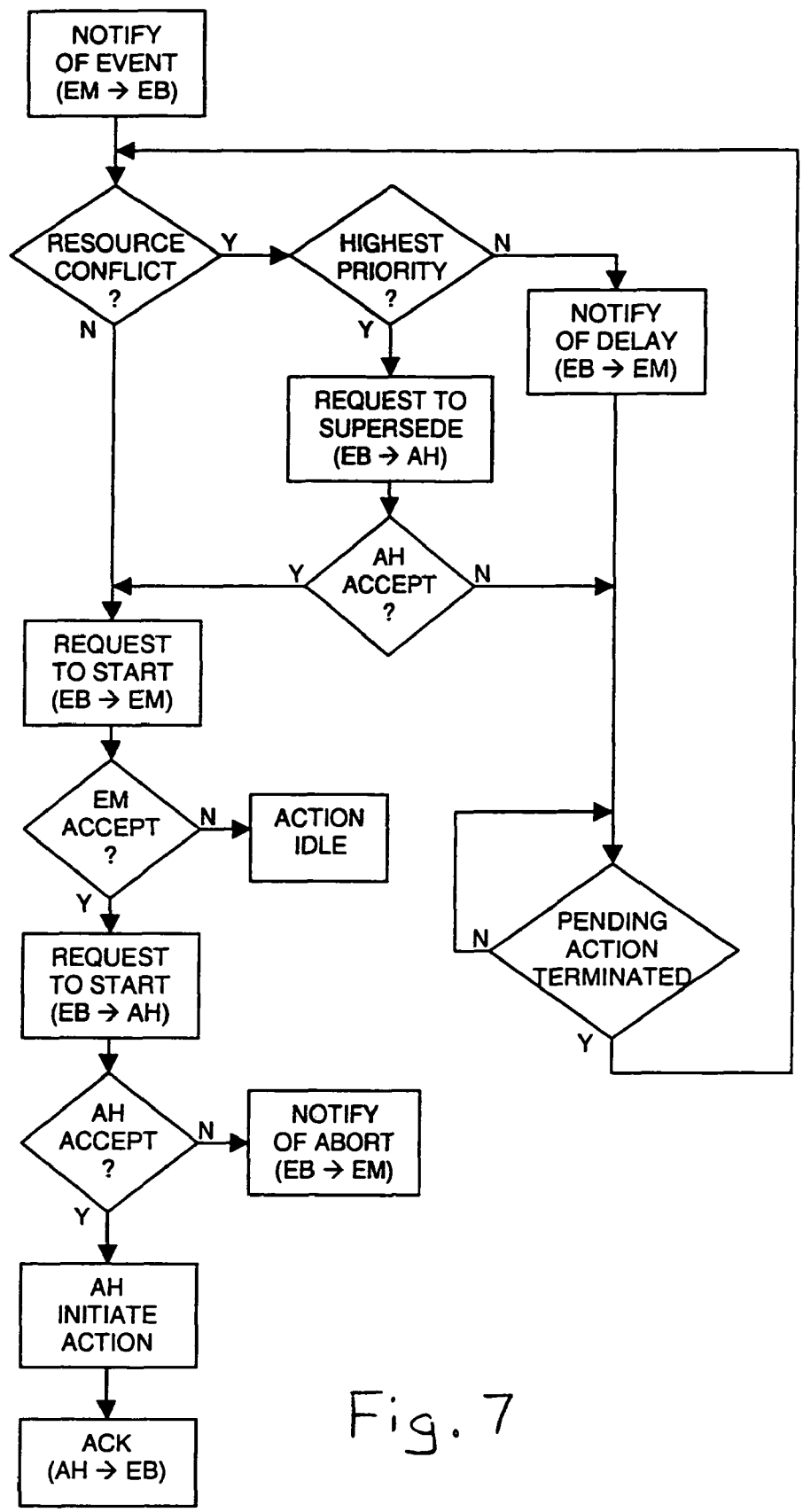
FIG. 7 is a flow diagram illustrating the triggering of an action after detection of an event in one embodiment.

The triggering of an action after detection of an event is illustrated in the flow diagram of FIG. 7. When the event manager detects the event, it notifies the event broker. The event broker determines whether the resources required to perform the associated action present a conflict with other users of the resources (e.g., actions which are currently running in response to other events.) If there is no resource conflict, the event broker transmits a request to the event manager to start the action. If there is a resource conflict, the event broker determines whether the action associated with the detected event has the highest priority among the conflicting actions. If the action has the highest priority, the event broker transmits a request to the action handler to supersede currently running actions which present a conflict. The action handler may accept or reject this request. If the request is accepted, the event broker transmits a request to the event manager to start the action. If the action handler does not accept the event broker's request to supersede the currently running action, the action remains idle. That is, the event booking mechanism waits for the pending action to be terminated and then repeats the foregoing steps, beginning with the resource conflict check.

After the event broker transmits the request to start the action to the event manager, the event manager may either accept or reject the request. If the request is rejected, the action is idle. In this instance, the action does not simply remain idle until a pending action is terminated. The action remains idle until the event manager or event broker reactivates or terminates the action. If the event manager accepts the request to start the action, a similar request is transmitted from the event broker to the action handler. If the action handler rejects the request, the event broker notifies the event manager that the action has been aborted. If the action handler accepts the request, the action is started by the action handler. The action handler also transmits an acknowledgement to the event broker.

It should be noted that, in the embodiment described above, the event broker does not immediately attempt to start an action upon detection of the event which corresponds to the action. The event broker instead checks for resource conflicts and may request that other actions be superseded. As a result, there may be a delay during which some of the conditions which define the event may change. Consequently, the action associated with the event may become obsolete. The event broker therefore queries the event manager after checking the resources and before starting the action.

Figure 8:
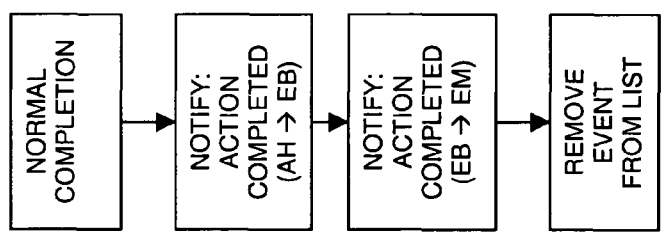
FIG. 8 is a flow diagram illustrating normal completion of an action in one embodiment.

Once the action has been started, it may either be completed or terminated. Referring to FIG. 8, a flow diagram of the normal completion of an action is shown. If the action is completed normally, the action handler transmits a notification to the event broker upon completion of the action. The event broker in turn transmits a notification of the completion to the event manager. The event is then removed by the event broker from the list of booked events. It should be noted that the event is only removed if it is a "one-shot" event—if the event booking is intended to apply to multiple occurrences of the event (e.g., taping a television program at the same time every week,) the event will not be removed.

Figure 9:
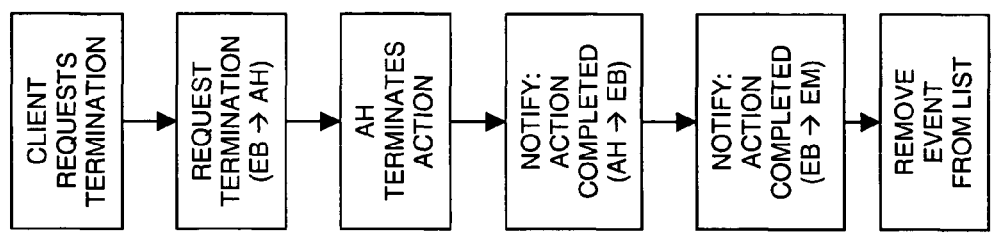
FIG. 9 is a flow diagram illustrating termination of an action in one embodiment.

Referring to FIG. 9, a flow diagram of the termination of an action is shown. In this figure, a client requests termination of the action. The request is transmitted to the event broker. The event broker and transmits a termination request to the action handler. The action handler terminates the action and transmits an acknowledgement to the event broker. The event broker then transmits a notification of the termination to the event manager. After notifying the event manager, the event broker removes the corresponding event from the list of booked events (unless the event booking applies to multiple occurrences.)

It should be noted that the foregoing example is directed to the methods employed in a single embodiment. This example is intended to be illustrative rather than limiting. Various modifications of the described methods may be employed in other embodiments of the invention.

The inventive booking mechanism described above can be used in many situations. For example:

In one instance, the event manager may be a calendar agent which is configured to detect the time and date at which a television program will start. At the designated time, the calendar agent would notify the event broker. The event broker would notify an action handler which is configured to start a VCR recording for a certain duration. Alternately, the action handler could pop-up a dialog box prompting the user for approval to record the television program or simply notifying the user that the television program is beginning.

In another instance, the event manager may be a bookmark agent which is configured to watch for certain types of service information in a broadcast signal (e.g., metadata identifying television programs about soccer or movies in 16/9 format.) When the designated service information is detected, the event broker is notified. The event broker then notifies the action handler, which may present this information to the user or start recording the program or movie.

In yet another instance, the event manager may be a teletext agent which is configured to watch for specific information (e.g., stock information) in a teletext stream. When this information is detected, the event broker is notified and in turn notifies an action handler which captures the information and presents it to the user.

In yet another instance, the event manager may be a service list agent which is configured to detect television channels on a specific network or within a particular grouping of channels (sometimes referred to as a bouquet.) When the event manager detects a channel, it notifies the event broker, which notifies action handler. The action handler is configured to identify the television channel and add the channel to a list of channels. In this manner, a list of channels can be dynamically constructed. The booked event can be defined so that, when the channel list is complete, an application can be launched to allow the user to browse the list.

In yet another instance, the event manager may be configured to detect emails which are embodied in a broadcast signal. Upon detecting an email, the event broker and action handler are notified. The action handler is configured to launch a small application which causes the receiver to beep at the user or display an icon on the television screen to notify the user that an email has arrived.

In yet another instance, the event manager may be configured to monitor a broadcast signal for specific carousel files or modules. The corresponding action handler could be configured to notify or launch an application (e.g., a stock ticker application) when the file or module is received, or whenever a modified or updated copy is received.

In yet another instance, the event manager may be configured to detect a user profile which is prepared by a broadcast provider and which must be stored in the set-top box (receiver.) The action handler is configured to acquire the user profile and store it in the set-top box.

In addition to the above described embodiment, the booking mechanism may be employed at any point in the broadcast chain. For example, the booking mechanism may be employed at the site of a network broadcaster or other content provider, at a local broadcasting station, or at the site of the end user. Further, the booking mechanism may be employed in other contexts as well. For example, the booking mechanism may be used in relation to computer users connected to the Internet who are receiving signals via their Internet connection and surfing the World Wide Web. In such a case, the event broker may comprise software running on the users personal computer or other Internet access device.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A system for booking events and initiating actions corresponding to said events, said system comprising:
   an event broker configured to register a plurality of event bookings in response to requests from one or more clients, wherein each said event booking identifies an event which may occur in the future and an action to be taken should the identified event occur;
   one or more event managers, wherein each of said one or more event managers is configured to detect particular types of events; and
   one or more action handlers, wherein each of said one or more action handlers is configured to initiate particular types of actions;

wherein each of said event broker, said clients, said event managers, and said action handlers comprise distinct functional entities;

wherein a first event manager of said one or more event managers is configured to notify said event broker of a first event which corresponds to a first event booking, in response to detecting said first event;

wherein the event broker is configured to notify a first action handler which corresponds to the first event booking, in response to receiving notification from the first event manager of the detected first event; and wherein the first action handler is configured to initiate a first action, in response to receiving notification from the event broker of the detected first event;

wherein a first request of the requests for an event booking identifies a first event which may occur in the future and a first action to be taken upon occurrence of said first event, wherein the first request includes a description of the first event using a syntax which is unintelligible to the event broker, but which is intelligible to a first event manager of the event managers, wherein subsequent to receiving notice of said event booking, said first event manager is configured to determine whether said event booking will be accepted by said first event manager, and provide a positive acknowledgement to said event broker in response to determining said event booking is accepted.

2. The system of claim 1 wherein said first event manager is not configured to communicate directly with said first action handler.

3. The system of claim 1 wherein said system is implemented as a framework in a receiver for a broadcast system comprising a software layer between an application layer and a driver layer.

4. The system of claim 3 wherein said event broker, said one or more event managers and said one or more action handlers comprise library extensions accessible by an operating system executing in said receiver.

5. The system of claim 1, wherein in response to receiving a request to register said first event booking, said event broker is configured to:
identify and select said first event manager from a plurality of event managers, wherein said first event manager is identified as being configured to detect events of a type corresponding to said first event; and
identify and select said first action handler from a plurality of action handlers, wherein said first action handler is identified as being configured to initiate actions of a type corresponding to said first action.

6. The system of claim 1 wherein at least a portion of said events are associated with a broadcast signal.

7. The system of claim 1 wherein said event broker is configured to store in non-volatile storage said event bookings from a plurality of distinct clients.

8. The system of claim 7 wherein each of said stored event bookings has a corresponding expiration time and wherein said event broker is configured to unregister ones of said event bookings which have passed said expiration time.

9. The system of claim 1 wherein said events corresponding to said event bookings comprise a plurality of distinct event types.

10. The system of claim 1 wherein said actions corresponding to said event bookings comprise a plurality of distinct action types.

11. The system of claim 1 wherein said event broker is configured to determine resources required by said actions and to resolve resource conflicts between said actions.

12. The system of claim 1 wherein said event broker is configured to maintain ranks corresponding to said event bookings and, if a plurality of said events have been detected, to initiate said corresponding actions in an order determined by said ranks.

13. The system of claim 1 wherein clients are configured to access event bookings which have been stored by the event broker, said access comprising a query, a modification, or a termination of a stored event booking, and wherein said event broker is configured to control said access to said event bookings by clients based on permissions associated with said accesses and said event bookings.

14. A method for brokering and managing event bookings, said method comprising:
receiving a request from a client for an event booking at an event broker, wherein said request identifies a first event which may occur in the future and a first action to be taken upon occurrence of said first event;
registering said event booking request, wherein said event broker notifies a first event manager corresponding to said first event, and notifies a first action handler corresponding to said first action, wherein said event broker, said client, said first event manager, and said first action handler comprise distinct functional entities;
detecting said first event by said first event manager;
said first event manager notifying said event broker of said detection of said first event;
said event broker providing notification to said first action handler of said detection of said first event; and
initiating said first action by said first action handler in response to detecting said notification from said event broker;
wherein the request includes a description of the first event using a syntax which is unintelligible to the event broker, but which is intelligible to the first event manager, wherein subsequent to receiving notice of said event booking from said mechanism, said first event manager is configured to determine whether said event booking will be accepted by said first event manager, and provide a positive acknowledgement to said event broker in response to determining said event booking is accepted.

15. The method of claim 14 wherein said plurality of event bookings are registered in a central location.

16. The method of claim 14 wherein said events corresponding to said plurality of event bookings comprise a plurality of event types, wherein said event types are detected by a plurality of event managers.

17. The method of claim 14 wherein registering one of said booking events comprises storing in non-volatile storage information identifying one of said plurality of event managers which is configured to detect said corresponding event.

18. The method of claim 14 wherein said actions corresponding to said plurality of event bookings comprise a plurality of action types, wherein said action types are initiated by a plurality of action handlers.

19. The method of claim 18 wherein registering one of said booking events comprises storing in non-volatile storage information identifying one of said plurality of action handlers which is configured to initiate said corresponding action.

20. The method of claim 19 wherein said action is selected from the group consisting of: downloading an application; launching an application; launching a popup; and notifying a running application of said one of said events.

21. A device comprising:
a signal receiver configured to receive a broadcast signal;
a first event manager, wherein said first event manager is configured to detect particular types of events;
a first action handler, wherein said first action handler is configured to initiate particular types of actions; and
an event broker mechanism, wherein said mechanism is configured to:
- receive a request for an event booking from a client, wherein said request identifies a first event which may occur in the future and a first action to be taken upon occurrence of said first event;
- register said event booking request, wherein said event broker notifies said first event manager and said first action handler;

wherein each of said event broker mechanism, said client, said first event manager, and said first action handler comprise distinct functional entities;

wherein said first event manager is configured to detect said first event and notify said event broker of said detection of said first event; and wherein said first action handler is configured to initiate said first action in response to receiving notice from said event broker that said first event has been detected;

wherein the request includes a description of the first event using a syntax which is unintelligible to the event broker mechanism, but which is intelligible to the first event manager, wherein subsequent to receiving notice of said event booking from said mechanism, said first event manager is configured to determine whether said event booking will be accepted by said first event manager, and provide a positive acknowledgement to said mechanism in response to determining said event booking is accepted.

22. The device of claim 21 wherein said device comprises an interactive television system receiver coupled to receive said broadcast signal from a broadcast station and configured to provide an output signal to a television.

23. The device of claim 21, wherein said event booking does not identify the first event manager, and wherein said event broker mechanism is further configured to:
- identify from a plurality of event managers configured to detect different types of events an event manager which is configured to detect events of a type corresponding to the first event; and
- register the identified event manager as the first event manager.

24. The device of claim 21, wherein said first event manager is not configured to communicate directly with said first action handler.

25. The device of claim 21, wherein said mechanism is further configured to:
- receive an additional request for an event booking, wherein said additional request indicates a second action;
- register said additional event booking request;
- determine a resource conflict exists between said event booking request and said additional event booking request; and
- resolve said resource conflict.

26. The device of claim 21, wherein clients are configured to initiate accesses to event bookings which have been stored by the event broker mechanism, said accesses comprising a query, a modification, or a termination of a stored event booking, and wherein said mechanism is configured to control said accesses to said event bookings based on permissions associated with said accesses and said event bookings.

27. The device of claim 21, further comprising a non-volatile storage device, wherein the event broker mechanism is configured to store event bookings on said non-volatile storage device.

* * * * *